US006969834B2

(12) United States Patent
Kaji et al.

(10) Patent No.: US 6,969,834 B2
(45) Date of Patent: Nov. 29, 2005

(54) LINE TYPE LUMINOUS DEVICE AND INDUCTION HEATING COOKER EMPLOYING SAME

(75) Inventors: Tetsuya Kaji, Kobe (JP); Katsuyuki Aihara, Akashi (JP); Yoshio Kinoshita, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 10/179,308

(22) Filed: Jun. 26, 2002

(65) Prior Publication Data

US 2003/0006230 A1 Jan. 9, 2003

(30) Foreign Application Priority Data

Jul. 3, 2001 (JP) ....................................... 2001-201652
Dec. 25, 2001 (JP) ....................................... 2001-391446

(51) Int. Cl.[7] .............................. H05B 6/12; F21V 7/04

(52) U.S. Cl. ....................... 219/620; 219/622; 219/506; 362/551; 362/92; 385/901

(58) Field of Search ................................ 219/620, 623, 219/624, 586, 720; 362/551, 555, 559, 560, 92, 93; 385/31, 123, 901

(56) References Cited

U.S. PATENT DOCUMENTS 5,659,643 A * 8/1997 Appeldorn et al. ........... 385/31
5,987,199 A * 11/1999 Zarian et al. ................. 385/31
6,144,317 A * 11/2000 Sims .......................... 340/907
6,488,397 B1 * 12/2002 Masutani et al. ........... 362/551
6,520,655 B2 * 2/2003 Ohuchi ........................ 362/31

FOREIGN PATENT DOCUMENTS

| | | | |
|---|---|---|---|
| DE | 2437149 | 2/1976 | |
| EP | 0922910 | 6/1999 | |
| GB | 2324599 | 10/1998 | |
| JP | 2-223185 | * 9/1990 | ................. 219/624 |
| JP | 06-033182 | 4/1994 | |
| JP | 06-118247 | 4/1994 | |
| JP | 06-036002 | 5/1994 | |
| JP | 07-110408 | 4/1995 | |
| JP | 07-312279 | * 11/1995 | |
| JP | 10-207408 | 8/1998 | |
| JP | 2000-222907 | * 8/2000 | |
| JP | 2001-160483 | * 6/2001 | |

* cited by examiner

*Primary Examiner*—Philip H. Leung
(74) *Attorney, Agent, or Firm*—Bacon & Thomas, PLLC

(57) ABSTRACT

A luminous device includes one or more line-shaped luminous units each including an elongated light guide, one or more light sources, and a reflective layer. The light guide has a generally flat luminous surface for emitting light and another surface disposed away from the luminous surface. The light source serves to provide light into the light guide. The reflective layer is disposed on the above-mentioned another surface of the light guide. The light guide may have a ring shape. Since the luminous device produces a continuous line-shaped luminous image, e.g., a ring-shaped luminous image, it may be used for clearly indicating a heating range of an induction heating cooker.

26 Claims, 18 Drawing Sheets

LINE TYPE LUMINOUS DEVICE AND INDUCTION HEATING COOKER EMPLOYING SAME

FIELD OF THE INVENTION

The present invention relates to a line type luminous device; and more particularly, to a line type luminous device having a flat luminous surface and an induction heating cooker incorporating therein same.

BACKGROUND OF THE INVENTION

Referring to FIG. 1, there is illustrated a conventional line type luminous device disclosed in Japanese Patent Laid-Open Publication No. 2000-222907.

The line type or line-shaped luminous device 1 includes a light source 2 and a cylindrical light guide 3 having a circular cross-section. The light guide 3 serves to guide light radiated from the light source 2. The line type luminous device 1 further includes at least one reflective layer 4 of a strip-like shape printed on the side of the light guide 3 along a lengthwise direction thereof. Light emanated from the light source 2 enters at one end of the light guide 3 and travels therealong. While traveling, parts of the light are gradually reflected from the reflective layer 4 and emitted through an opposite surface of the reflective layer 4, so that a line type luminous image can be displayed.

Since, however, the light guide 3 is of a cylindrical shape having a convex surface, the light diverges after passing an imaginary focal point thereof to thereby make it difficult to obtain a clear luminous image. Moreover, since the light can be emitted from the whole surface except the reflection layer 4, the light intensity diminishes rapidly as the distance from the light source increases along the light guide 3. Therefore, the difference between the brightness at a point close to the light source and that at a point far away from the light source is too big to make a good display.

Such a luminous device can be used for various purposes and an induction heating cooker is an example of such an equipment that employs a luminous device. The induction heating cooker usually includes an induction heating coil to which a high frequency alternating current is selectively applied. When a pot acting as a load is disposed over the induction heating coil, a high frequency alternating flux is set up within the pot to generate eddy-current circulation therein, thereby causing the Joule heating in the pot itself. Since the pot itself is heated, a heating state or a heating region of the induction heating cooker may not be visibly recognized unlike a gas range or an electric range using a visible heating source such as a gas fire or a red-hot heating coil. Therefore, the induction heating cooker conventionally employs the luminous devices or lamps capable of visually indicating a heating state or a heating region thereof.

Japanese Patent Laid-Open Publication No. 95-312279 discloses such a conventional induction heating cooker employing a luminous device to display a heating region and a heating state thereof. The luminous device of the above-mentioned Japanese Patent includes a multiplicity of first light-emitting diodes (LEDs) arranged around an outer circumference of an induction heating coil of the induction heating cooker. While a current is being applied to the induction heating coil, the first LEDs are simultaneously turned on, so that the heating region can be displayed. Optionally, second LEDs are further arranged around the first LEDs to indicate a heating level of the induction heating cooker.

The above-described induction heating cooker, however, requires a lot of LEDs to fully display the outer circumference of the induction heating coil. With a small number of LEDs, the visual effect of the luminous device may be reduced and the heating region of the induction heating coil may not be clearly identified.

Japanese Patent Laid-Open Publication No. 2001-160483 discloses an alternative conventional luminous device for indicating the heating region and state of an induction heating cooker. In FIG. 2, the luminous device of the above-mentioned Japanese Patent includes a lighting segment 5 having a fan-shaped or a sector-shaped light guide 8 and a light source 6 disposed at a narrow end portion thereof. Disposed at a wide end portion of the light guide 8 is a luminous surface 7. The lighting segment 5 is disposed under an induction heating coil (not shown), and the wide end portion thereof is upwardly bent such that the luminous surface 7 oppositely faces a top plate (not shown) positioned over the induction heating coil.

The lighting segment 5 is assembled with others to make a ring shape along an outer circumference of the induction heating coil. While a current is being applied to the induction heating coil, the assembled lighting segments 5 are turned on in the ring shape to thereby indicate the heating region and state of the induction heating coil. The above-described luminous device, however, costs rather high because of its complicate structure where each lighting segment 5 has a corresponding light source 6 and is assembled with others to make the ring shape.

SUMMARY OF THE INVENTION

It is, therefore, an object of the present invention to provide a line type luminous device that can clearly and reliably provide a continuous line type luminous image with a reduced number of light sources.

It is another object of the present invention to provide an induction heating cooker employing the above-mentioned line type luminous device disposed around an outer circumference of an induction heating coil thereof to clearly indicate the heating region and state thereof.

In accordance with a preferred embodiment of the invention, there is provided a luminous device including: one or more line shaped luminous units, each luminous unit including: an elongated light guide having a generally flat luminous surface for emitting light and another surface disposed away from the luminous surface; one or more light sources for providing light into the light guide; and a reflective layer disposed on said another surface of the light guide.

In accordance with another preferred embodiment of the present invention, there is provided an induction heating cooker incorporating therein the above-explained luminous device, the cooker including: a light transmitting top plate disposed on a case; a heating region disposed on the top plate; and an induction heating coil disposed under the top plate corresponding to the position of the heating region, wherein the luminous device is arranged under the top plate along an outer circumference of the induction heating coil and the luminous device emits light toward the top plate along the whole part or portions of the outer circumference.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Figure 1:
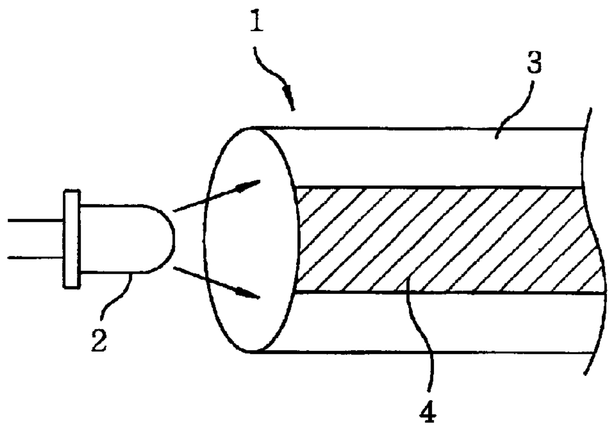
FIG. 1 illustrates a perspective view of a line type luminous device according to a prior art.
Figure 2:
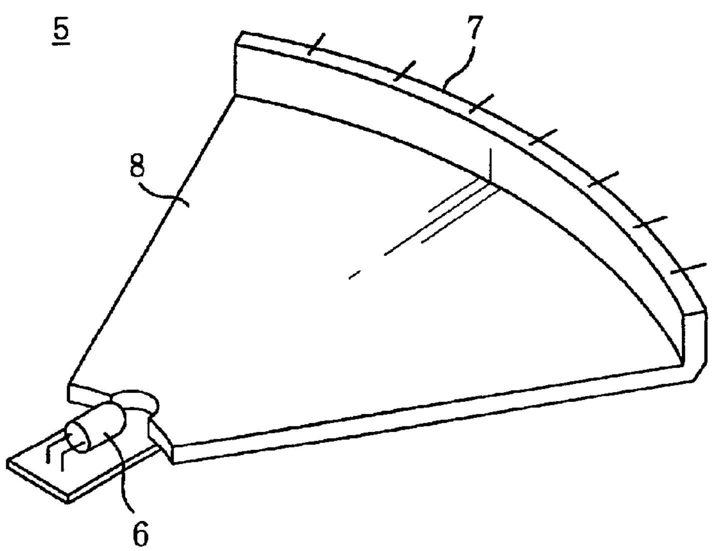
FIG. 2 shows a perspective view of one segment of a luminous device according to another prior art.
Figure 3:
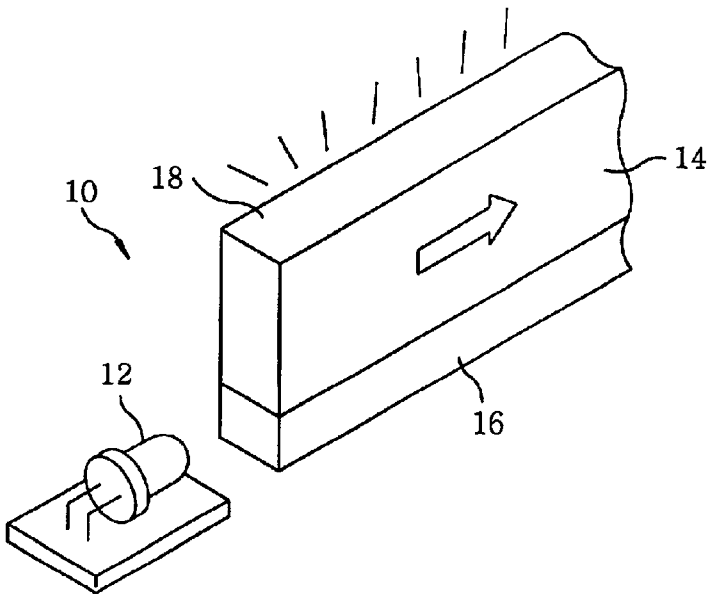
FIG. 3 provides a partial perspective view of a line type luminous device in accordance with a first preferred embodiment of the present invention.

FIG. 3 is a partial perspective view of a line type luminous device 10 (also referred to as a line-shaped luminous unit hereinafter) in accordance with a first preferred embodiment of the present invention.

The line type luminous device 10 includes an elongated light guide 14, a light source 12 disposed at one end thereof, and a reflective layer 16 disposed on a bottom surface thereof. The light guide 14 preferably has a substantially rectangular cross-section having two opposite long sides and two opposite short sides. One of the short sides corresponds to the reflective layer 16 and the other corresponds to a luminous surface 18.

The light source 12 may be a bulb or a light-emitting diode (LED) and the LED is preferably used therefor because of its diversity in colors. The light guide 14 serves to guide rays of light radiated from the light source 12 and is made of a transparent material, such as a glass or a plastic, e.g., acrylic resin, polycarbonate, polyamide, or polyimide. The reflective layer 16 serves to reflect rays of light traveling in the light guide 14 such that portions of the rays are directed toward the luminous surface 18 and transmitted therethrough.

The reflective layer 16 may be formed by means of a mechanical polishing and/or a chemical etching to provide an uneven surface topology to the bottom surface of the light guide 14. Alternatively, the reflective layer 16 may be provided by attaching an additional layer on the light guide 14. For example, an adhesive layer, such as a silicone rubber, or an adhesive tape may be attached on the bottom surface of the light guide 14 to act as the reflective layer 16. Besides the adhesive layer, a metallic layer having particles of a metal or a metal oxide, e.g., aluminum oxide, silicon oxide, and titanium oxide, may be employed as the reflective layer 16.

In addition, the reflective layer 16 may be formed by coating either a silicone paint or an urethane paint on the bottom surface of the light guide 14. When the above-mentioned paint layer is employed as the reflective layer 16, it is preferred that the transmissivity thereof is not higher than 20% and the reflectivity thereof is not lower than 80%. The luminous intensity of the luminous surface 18 depends on the configuration or specification of the reflective layer 16, as will be explained later.

The operation of the above-described luminous device 10 is now explained. Rays of light radiated from the light source 12 propagate inside the light guide 14 in a direction designated by an arrow of FIG. 3. The arrow corresponds to also an elongated direction of the light guide 14. Portions thereof are reflected from the reflective layer 16, so that portions of the reflected rays are emitted out through the luminous surface 18.

The rectangular cross-section of the light guide 14 generally provides orthogonal sets of two flat surfaces running parallel to each other. The reflective layer 16 is formed on one flat surface thereof and the opposite one acts as the luminous surface 18. Since the luminous surface 18 is flat, rays from the luminous surface 18 are radiated with very little divergence, so that the line type luminous device 10 can produce a clear line type luminous image along the light guide 14.

Figure 4:
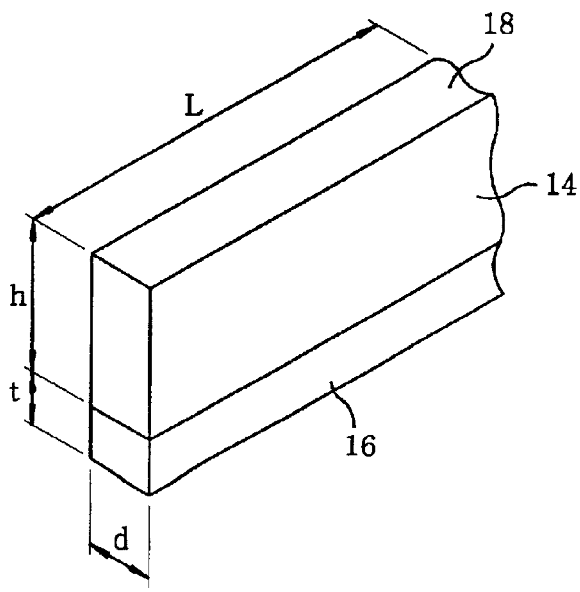
FIG. 4 is a partial perspective view of a light guide of the line type luminous device in accordance with the first preferred embodiment.

With reference to FIG. 4, effects of the reflective layer 16 are explained in more detail. Polycarbonate was selected for the light guide 14, which had the rectangular cross-section with a width of 3 mm and a height of 15 mm; silicone rubber (an adhesive) was selected for the reflective layer 16. Disposed at a distance of 1100 mm from the luminance surface 18 was an illuminometer (not shown) to measure the illuminance of the luminous surface 18 for various conditions of the reflective layer 16. The illuminance was 0.7 lux when no reflective layer was employed; 1.79 lux when just one reflective layer was employed opposite to the luminous surface 18; and 1.97 lux when all the surfaces of the light guide 14, except the luminous surface 18, were covered by the reflective layers.

From these results, the reflective layer 16 opposing the luminous surface 18 is verified to be sufficiently effective in increasing the amount of rays emitted out through the luminous surface 18. The other reflective layers covering the side surfaces of the light guide seem to be less effective for improving the illuminance of the luminous surface 18. In each case, however, a relatively clear line type image was observed because the luminous surface 18 was flat anyway.

Various modifications may be applied to the above-described basic configuration of the line type luminous device to improve luminous qualities thereof.

For example, a low refractive layer having a lower refractive index than that of the light guide 14 may be provided on each surface thereof except the luminous surface 18. In that case, rays from the light source 12 can travel farther along the light guide 14 because loss of light due to its leakage through the side surfaces of the light guide 14 is reduced.

Further, the reflectivity of the reflective layer 16 may partially vary along a longitudinal direction of the light guide 14 such that the intensity of rays radiated from the luminous surface 18 correspondingly varies therealong. By this modification, the line type luminous image produced from the line type luminous device can implement partially controlled intensities for aesthetic purposes or information carrying purposes.

Alternatively, the luminous surface 18 and the opposite surface thereof may be mirror planes formed by applying a mechanical and/or a chemical treatment. Since the mirror planes reduce a surface scattering thereon, rays can propagate farther along the light guide 14. If either the luminous surface 18 or the opposite surface is a mirror plane, it also contributes to the reduction of the surface scattering.

On the contrary, the luminous surface 18 and/or the opposite surface may be a diffuse reflection plane formed by applying a mechanical or a chemical treatment. Since rays are more diffused or scattered therefrom, larger amount of the rays can be emitted out through the luminous surface 18, so that a clear line type luminous image can be produced.

Returning to FIG. 3, the luminous surface 18 and the side surfaces contiguous thereto are extended along a traveling direction of light radiated from the light source 12. Therefore, a directive characteristic or an angular intensity variation of the light source 12 hardly affects the luminous quality of the luminous device in accordance with the preferred embodiments of the present invention. Further, because loss of light due to its leakage through the side surfaces of the light guide 14 is considerably small, rays can propagate much father along the light guide 14, so that the luminous image can be displayed along the entire length thereof.

Returning to FIG. 4, the cross-section of the light guide 14 is of a rectangular shape having a short side "d" and a long side "h". When the luminous surface 18 of the light guide 14 corresponds to the short side "d", rays from the light source 12 (FIG. 3) can travel farther along the light guide 14. Particularly, by further lengthening the long side "h" relative to a fixed short side "d", light can be made to travel much farther therealong. The relationship between the luminous intensity of the light guide 14 and the length of the long side "h" can be further clearly understood from Table 1 obtained from a second experiment, which will be explained later. In addition, when the long side "h" of the light guide 14 is greater than a thickness "t" of the reflective layer 16, loss of light is reduced, so that rays can propagate farther along the light guide 14.

The line type luminous device in accordance with the preferred embodiments of the present invention provides a line type luminous image, but the image is not limited to have a straight-line shape. That is to say, the line type luminous device may have the shape of a bar, a ring, or a polygon, e.g., a triangle formed by assembling a plurality of bar-shaped line type luminous devices.

The line type luminous device may provide various line type luminous images, besides the above-mentioned shapes. Particularly, a ring-shaped line type luminous device may be used for indicating an outer circumference of an induction heating coil included in an induction heating cooker.

Now, the light source 12 of the line type luminous device is explained in more detail.

Figure 5:
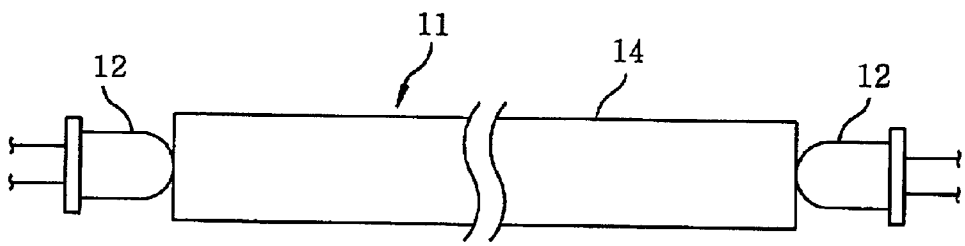
FIG. 5 depicts a plan view of a bar-shaped line type luminous device in accordance with the first preferred embodiment.
Figure 6:
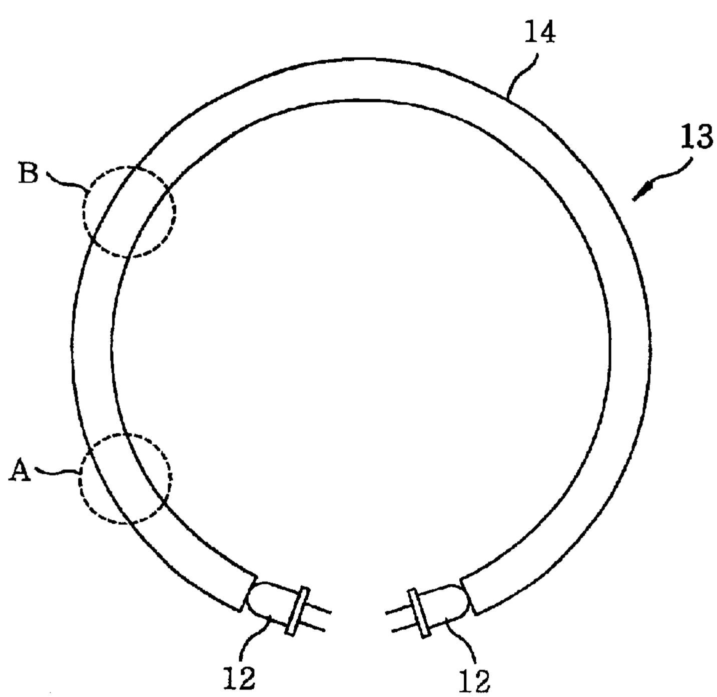
FIG. 6 gives a plan view of a ring-shaped line type luminous device in accordance with the first preferred embodiment.

If just one light source 12 is used, radiation strength of rays from the light guide 14, i.e., the brightness thereof, is gradually weakened along a longitudinal direction thereof. Accordingly, supplements of light are required at some portions of the light guide 14 to make the radiation strength thereof uniform. When a line type luminous device has a total length of 50 to 70 cm, two light sources are respectively required at both ends of the light guide for the uniform radiation strength of the line type luminous device. FIGS. 5 and 6 respectively show a bar-shaped line type luminous device 11 and a ring-shaped line type luminous device 13, each adopting two light sources 12. The light guide 14 has a rectangular cross-section in each case and a plastic molding may be generally applied to form a ring shape or a circular line shape of the light guide 14.

The brightness and the clearness of rays radiated from the luminous surface depend on the configuration of the reflective layer or the brightness and viewing angle of the light source. First to third experiments have been conducted to verify the above-mentioned relationships.

In the first experiment, the brightness and the clearness of the luminous surface were examined with various sample materials sequentially selected for the reflective layer. The test sample materials were silicone-based adhesive, silicone-based opaque paint, urethane-based opaque paint, hot melt adhesive paint, hot melt adhesive paint mixed with white glass beads, and silicone-based printing solution. The brightness and the clearness were examined at a first point "A" and a second point "B" of the ring-shaped line type luminous device 13 shown in FIG. 6. The first point "A" and the second point "B" were sequentially distanced from one of the light sources 12 in that order. Polycarbonate was selected for the light guide 14 of the ring-shaped line type luminous device 13. Results of the first experiment are subsequently explained.

When the silicone-based opaque paint or the urethane-based opaque paint was selected for the reflective layer, the brightness and the clearness were relatively good at both the first and the second point "A" and "B". Compared with the silicone-based paint or the urethane-based opaque paint, the silicone-based adhesive selected therefor caused a relatively low brightness at both the first and the second point "A" and "B". From these results, it can be inferred that the adhesive selected for the reflective layer absorbs light more than the paint selected therefor.

When the paint selected for the reflective layer was mixed with beads, the brightness was relatively low at both the first and the second point "A" and "B". Whereas, the paint without beads was involved with a relatively lower brightness only at the first point "A". From these results, it can be inferred that the beads scatter rays inside the light guide 14 and therefore more portions of the light leak through the side surfaces of the light guide 14.

In addition, when the reflective layer was formed by applying a printing, the brightness was also relatively low at both the first and the second point "A" and "B". This may be due to leakage in rays passing through the thin printed reflective layer. Therefore, when the printing is used to form the reflective layer, a sufficiently large thickness thereof is preferred, in spite of a high cost, for improving the brightness.

Figure 7A:
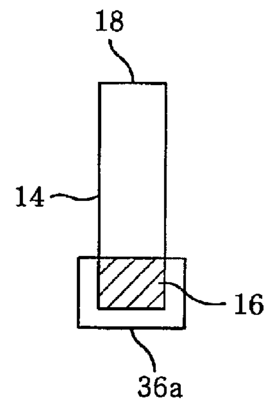
FIGS. 7A to 7C set forth sectional views and FIGS. 7D and 7E set forth partial perspective views of various modifications for the line type luminous device in accordance with the first preferred embodiment.
Figure 7B:
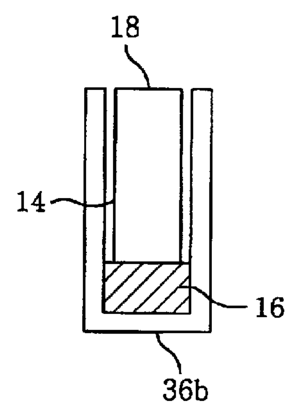
Figure 7C:
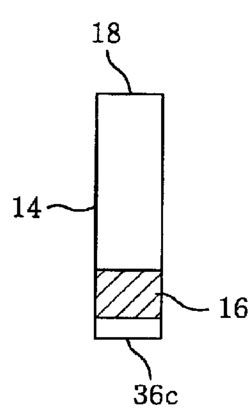

FIGS. 7A to 7E show various covers for covering the reflective layer 16. In FIGS. 7A to 7C, each of a first cover 36*a* to a third cover 36*c* is bonded on the bottom surface of the light guide 14 by an adhesive acting as the reflective layer 16 and provides a uniform gap into which the adhesive is applied, so that the reflective layer 16 can be formed with a uniform thickness to provide a uniform luminous image without stains. In case of employing the second cover 36*b* covering the side surfaces as well as the bottom surface of the light guide 14, the adhesive may be applied into overall gaps between the light guide 14 and the second cover 36*b* to completely prevent leakage of light.

Figure 7D:
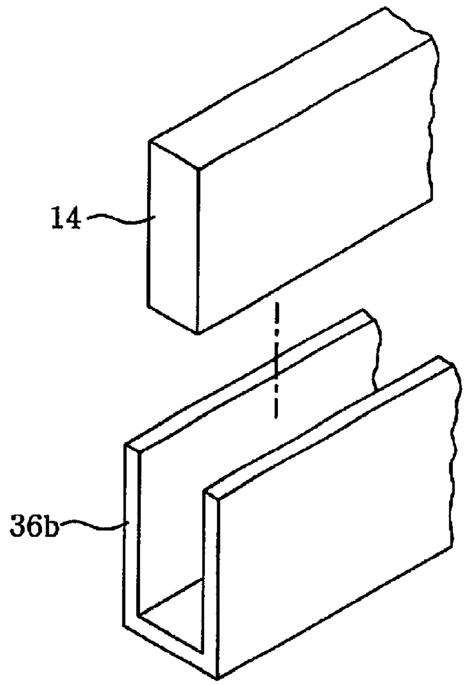
Figure 7E:
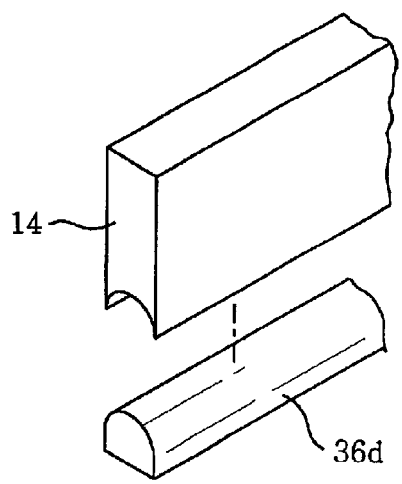

As shown in FIG. 7D, the light guide 14 may be inserted into the second cover 36*b* having a U-shaped angled cross-section. On the other hand, as shown in FIG. 7E, a fourth cover 36*d* having a curved top surface may be attached onto a correspondingly curved bottom surface of the light guide 14. In FIGS. 7A to 7E, the adhesive to bond the cover on the light guide 14 acts as the reflective layer 16. The reflective layer 16, however, may be integrally formed with the light guide 14 by means of the previously mentioned mechanical or chemical treatment.

Figure 8:
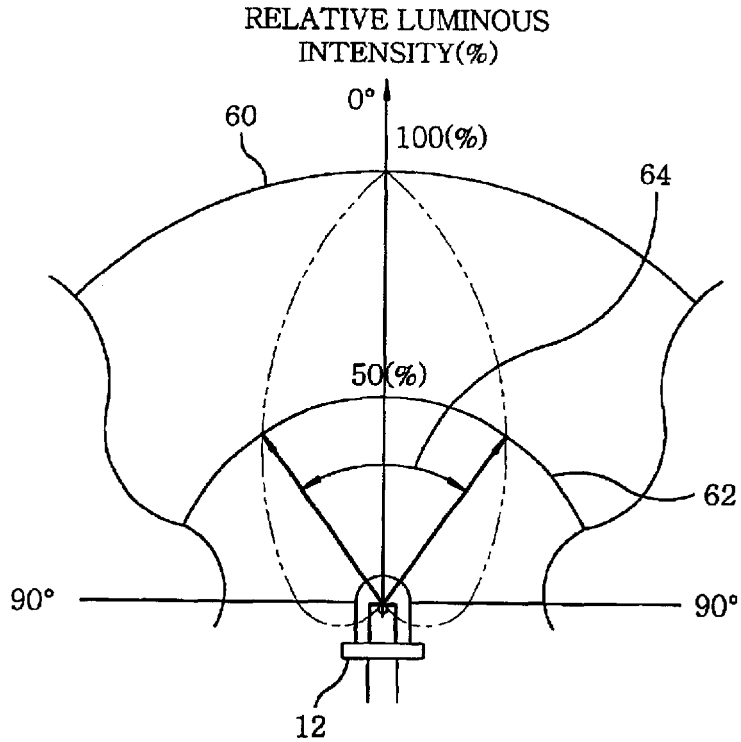
FIG. 8 is a graph showing a directive characteristic of a light source.

With reference to FIGS. 4 and 8, the second experiment and the result thereof are now explained.

If the light source has a wide viewing angle or a strong directivity, the illuminance is rapidly deteriorated along the longitudinal direction of the light guide. Table 1 obtained from the second experiment shows the above-explained relationship.

TABLE 1

| No. | Viewing angle (degree) | Height (h, mm) | Illuminance (lux) 1 = 100 mm | Illuminance (lux) 1 = 150 mm |
|---|---|---|---|---|
| 1 | 15 | 5 | 0.15 | 0.03 |
| 2 | 20 | | 0.17 | 0.04 |
| 3 | 30 | | 0.16 | 0.04 |
| 4 | 15 | 10 | 0.30 | 0.10 |
| 5 | 20 | | 0.27 | 0.08 |
| 6 | 30 | | 0.27 | 0.08 |
| 7 | 60 | | 0.23 | 0.06 |
| 8 | 100 | | 0.22 | 0.06 |
| 9 | 15 | 15 | 0.42 | 0.24 |
| 10 | 20 | | 0.45 | 0.24 |
| 11 | 30 | | 0.43 | 0.22 |
| 12 | 60 | | 0.32 | 0.14 |
| 13 | 100 | | 0.31 | 0.15 |

In the second experiment, a driving voltage of each LED acting as the light source 12 was set to provide 0.7 lux at a distance of 50 mm therefrom. Then, the illuminance of the luminous surface 18 was measured at a first and a second length of 100 mm and 150 mm along the light guide 14. The width "d" of the light guide 14 was fixed to 3 mm and the height "h" thereof was set to 5, 10, or 15 mm. Further, tested viewing angles of the LED were 15, 20, 30, 60, and 100 degrees.

As seen from Table 1, the illuminance gradually increased as the height "h" of the light guide 14 increased. Further, when the viewing angle of the LED was within the range of 15 to 30 degrees, the illuminance was relatively high regardless of the length "l" thereof, which meant that the illuminance was relatively more uniform along the light guide 14. The uniform illuminance refers not to an optical uniformity but to a visual uniformity in a user's view. Consequently, it is verified that the optimum viewing angle of the LED is within a range of 15 to 30 degrees for the above-mentioned size of the light guide 14.

It is inferred from the results of the second experiment that an LED having a wider viewing angle cannot efficiently supply rays of light for the light guide 14. It may be because the wide viewing angle causes rays from the LED to radiate in such a wide angular direction that a very small portion thereof can enter the light guide 14. When the viewing angle of the light source 12 is within the above-mentioned optimum range, a large portion of the rays from the light source 12 enters the light guide 14, so that rays from the light source 12 can travel farther along the light guide 14.

The light guide 14 of the above-mentioned size is suitable for indicating a heating region of an induction heating cooker in view of a design rule as well as a human visual perceptibility. If the light guide has a circular cross-section, a wide reflective layer may reduce the cross-section thereof, so that it is difficult to make a sufficient amount of light rays enough to illuminate enter the light guide. Further, a narrow reflective layer will cause such a strong directivity of the line type luminous device that the heating region may not be readily identified except when a user looks from right above the induction heating cooker.

In FIG. 8, the above-mentioned viewing angle of the light source 12 is defined. The viewing angle, as well known in the related art, refers to a full angle at half of maximum power. The radial axis represents a relative luminous intensity of the light source 12 and the angular axis represents a viewing angle thereof. The light source 12 is positioned at an origin of the graph and a phantom line surrounding the origin represents a directive characteristic curve thereof. A first solid line 60 and a second solid line 62 represent 100% and 50% intensity line, respectively. The directive characteristic curve meets the second line 62 at two points, being respectively connected with the origin of the light source 12 by arrows. The two arrows make an angle 64, which represents the viewing angle of the light source 12.

Figure 9:
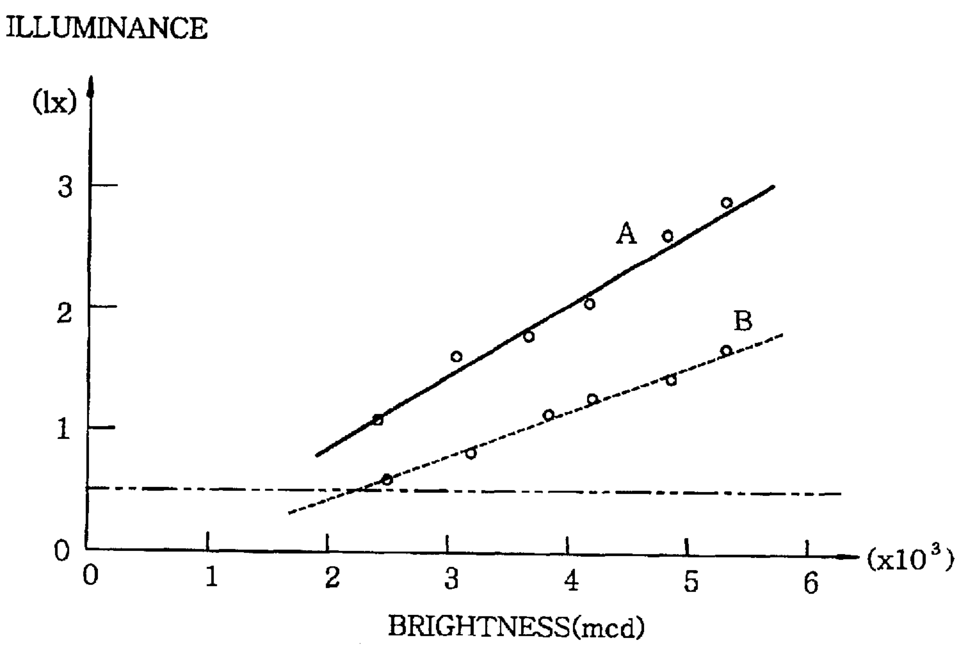
FIG. 9 is a graph showing a relationship between a brightness of an LED acting as the light source and an illuminance of a light guide of the line type luminous device in accordance with the first preferred embodiment.

With reference to FIGS. 6 and 9, the third experiment and the result thereof are now explained. FIG. 9 shows a relationship between the illuminance of the light guide 14 and the brightness or the luminous intensity of the light source 12. A first and a second line "A" and "B" of FIG. 9 correspond to the first and the second point "A" and "B" of FIG. 6 and are distanced 3 cm and 15 cm away from their closer light source 12, respectively.

The line type luminous device is required to have a diameter of about 23 cm to be adapted for an induction heating cooker. If a minimum illuminance of the line type luminous device is set to about 0.5 lux, four light sources each of which provides a brightness of 2000 mcd or two light sources each of which provides a brightness of 5000 mcd are required.

If the light source is very bright, light thereof can propagate much farther therefrom. Therefore, by using very bright light sources, the number of the light source needed can be reduced. Though a combination of light sources can provide an acceptable brightness range of 1000 to 10000 mcd, a preferable brightness of the light source is within a range of 2000 to 6000 mcd for practical purposes, i.e., to indicate the heating region of the induction heating cooker. In this case, light provided by the light source preferably has a wavelength of 600 to 630 nm.

As explained hitherto, the line type luminous device in accordance with the first preferred embodiment of the present invention includes the light source 12 for providing light and the light guide 14 for guiding the light from the light source 12. The light guide 14 has the reflective layer 16 for reflecting the light and the flat luminous surface 18 opposite thereto for externally emitting rays. The reflective layer may be integrally formed with the light guide by means of the mechanical or the chemical treatment. Alternatively, the reflective layer 16 may be formed to have a predetermined thickness by applying the painting or the coating. The painting is preferred to the printing since a required thickness of the reflective layer can be more easily obtained by employing the painting.

If the leak of light through the reflective layer 16 is reduced, the line type luminous device can produce a more clear line type luminous image, making it useful for various purposes. For example, the line type luminous device can be mounted under a top plate of an induction heating cooker to clearly indicate a heating region thereof for a user's convenience. The line type luminous device is required to give a sufficient visual effect even when the line type luminous device is assembled to a main apparatus. Therefore, the luminous intensity thereof is preferably determined based on what the main apparatus is or under which condition the main apparatus is used.

Hereinafter, a second preferred embodiment of the present invention is explained. Like parts of the first preferred embodiment are represented by like reference numerals and will not be described in detail.

Figure 10A:
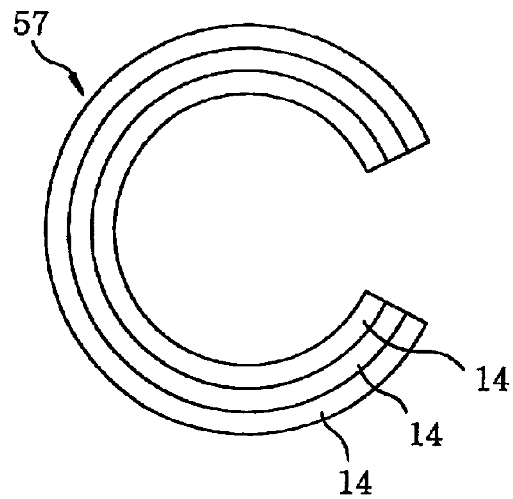
FIG. 10A shows a schematic plan view of a line type luminous device in accordance with a second preferred embodiment of the present invention.

FIG. 10A shows a ring-shaped line type luminous device 57 in accordance with the second preferred embodiment. The line type luminous device 57 includes a multiple number of, e.g., three, light guides 14, each having a same shape as that of the first preferred embodiment. The three light guides 14 are concentrically arranged together, and at least one light source (not shown) is provided for each light guide 14. The concentrically arranged light guides may be disposed along an outer circumference of an induction heating coil (not shown) of an induction heating cooker (not shown).

Figure 10B:
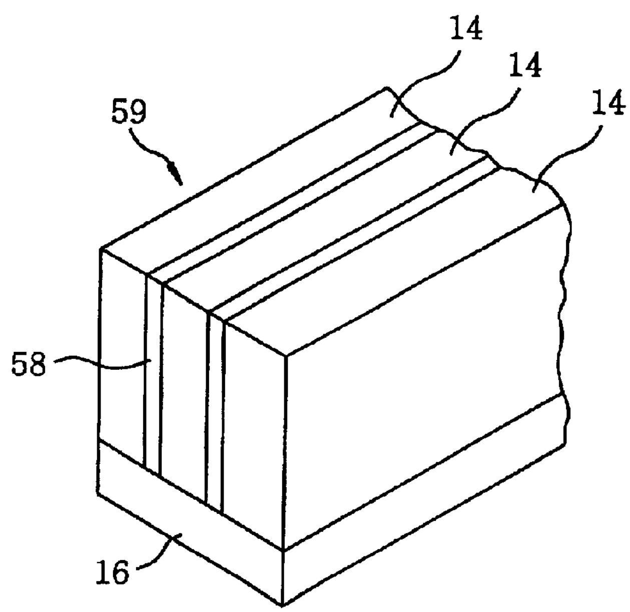
FIG. 10B provides a partial perspective view of an alternative line type luminous device in accordance with the second preferred embodiment.

FIG. 10B shows a perspective view of another line type luminous device 59 in accordance with the second preferred embodiment. The line type luminous device 59 also includes a multiple number of, e.g., three, concentric light guides 14 assembled together and at least one optical isolator 58 interposed between adjacent light guides 14. Each optical isolator 58 is formed in a longitudinal direction of the light guides 14, and at least one light source (not shown) is provided for each light guide 14. The line type luminous device 59 also may be of a ring shape, i.e., arranged along the outer circumference of the induction heating coil of the induction heating cooker. Herein, the light sources may differ in type, color, size, brightness, or even whether they are turned on or not. By using the line type luminous device 59, various patterns of luminous images can be provided for the induction heating cooker on the basis of functions, operating states, heating levels, or operation times thereof.

Figure 11A:
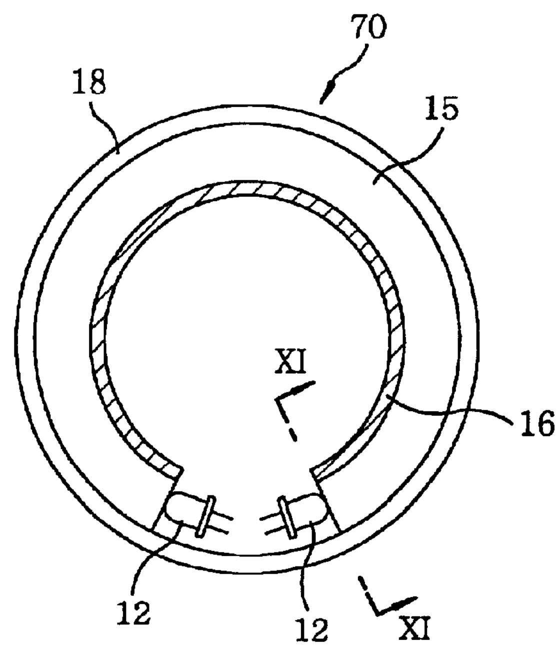
FIG. 11A illustrates a plan view of a line type luminous device in accordance with a third preferred embodiment of the present invention.
Figure 11B:
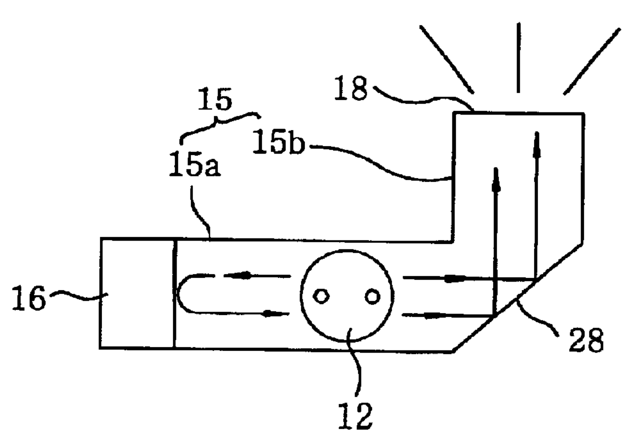
FIG. 11B depicts a sectional view taken along a line "XI—XI" of FIG. 11A.

FIG. 11A shows a plan view of a line type luminous device 70 in accordance with a third preferred embodiment of the present invention, and FIG. 11B is a sectional view thereof taken along the line XI—XI of FIG. 11A.

The line type luminous device 70 includes a ring-shaped light guide 15 having an angled or a L-shaped cross-section and two light sources 12 respectively disposed at both ends thereof. The light guide 15 has a planar part 15*a*, an angled part 15*b* upwardly extended therefrom, and a reflection part 28 disposed along an outer circumference of the planar part 15*a*. The planar part 15*a* has a reflective layer 16 arranged along an inner circumference thereof and the angled part 15*b* has a luminous surface 18 disposed on a top surface thereof. Consequently, the reflection part 28 is disposed between the reflective layer 16 and the luminous surface 18. Rays radiated from each light source 12 or reflected from the reflective layer 16 are reflected at the reflection part 28 formed of a 45 degree chamfer or a C-cut surface.

FIGS. 12 to 16 show various ring-shaped line type luminous devices in accordance with a fourth preferred embodiment of the present invention. The ring-shaped line type luminous devices in accordance with the fourth preferred embodiment produce a more complete ring-shaped line type image of a uniform brightness. Like parts of the first preferred embodiment are represented by like reference numerals and will not be described in detail.

Figure 12:
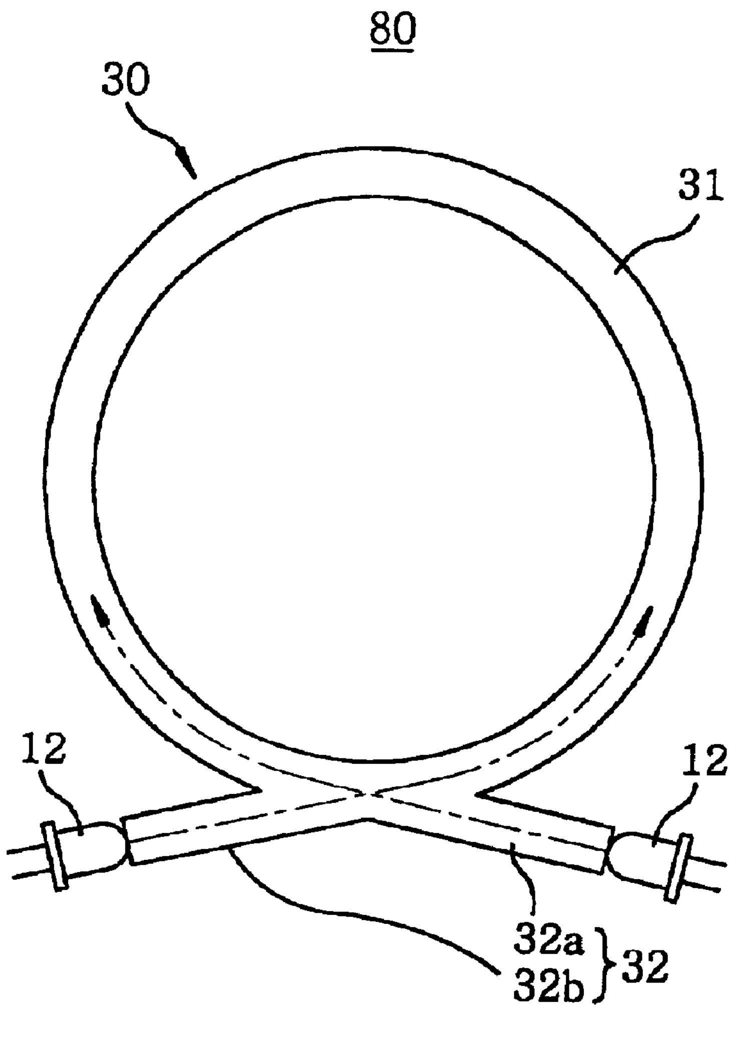
FIG. 12 gives a plan view of a first exemplary line type luminous device in accordance with a fourth preferred embodiment of the present invention.

In FIG. 12, a first ring-shaped line type luminous device 80 in accordance with the fourth preferred embodiment includes two light sources 12 and a ring-shaped light guide 30. The ring-shaped light guide 30 has a ring part 31, a first light-entering portion 32*a*, and a second light entering-portion 32*b*. As shown in FIG. 12, reference numeral 32 refers to the first and second light-entering portions 32*a*, 32*b*.

Rays radiated from the two light sources 12 respectively enter the first and the second light-entering portion 32*a* and 32*b*, which are extended from an outer circumference of the ring part 31. Inside the ring part 31, first rays entering the first light-entering portion 32*a* travel around counterclockwise and second rays entering the second light-entering portion 32*b* clockwise. The first and the second light-entering portion 32*a* and 32*b* preferably meet the ring part 31 near their joint such that exits of the first and the second light-entering portion 32*a* and 32*b* are very close. Accordingly, the first rays and the second rays cross each other just after entering the ring part 31 and completely go round the ring part 31, so that the complete ring-shaped luminous image can be produced.

Figure 13A:
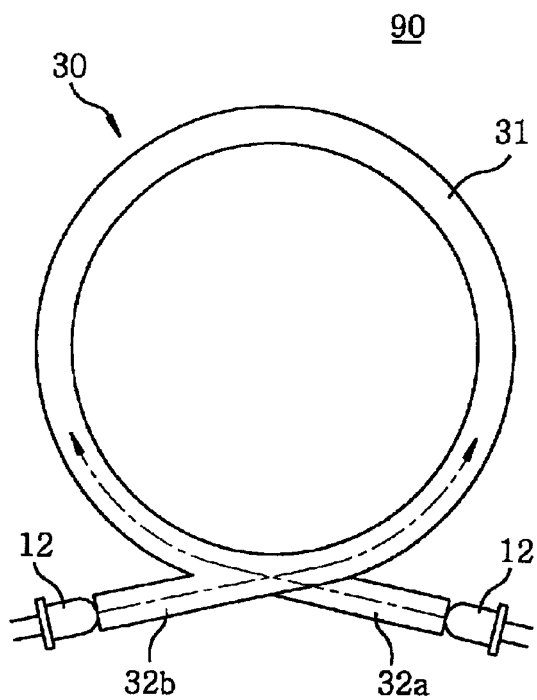
FIG. 13A sets forth a top view of a second exemplary line type luminous device in accordance with the fourth preferred embodiment.
Figure 13B:
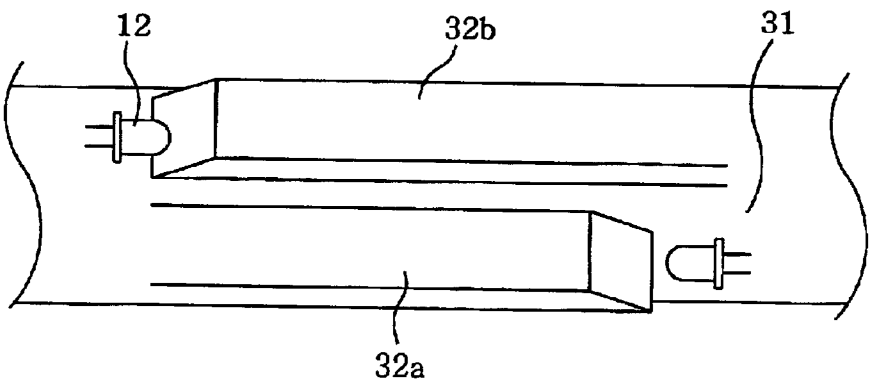
FIG. 13B is a front view of the line type luminous device of FIG. 13A.

FIG. 13A shows a plan view of a second ring-shaped line type luminous device 90 in accordance with the fourth preferred embodiment and FIG. 13B is a front view thereof.

The second luminous device 90 is identical to the first luminous device 80 of FIG. 12 except that the first and second light-entering portion 32*a* and 32*b* of the light guide 30 are spaced apart from each other as shown in FIG. 13B. Since light paths of the first and the second rays are spatially separated before meeting the ring part 31, the loss of light due to interference therebetween can be reduced. If such a structure is to be formed by applying an integral molding, a slit may be provided between the first and the second light-entering portion 32*a* and 32*b* for simplicity.

Figure 14A:
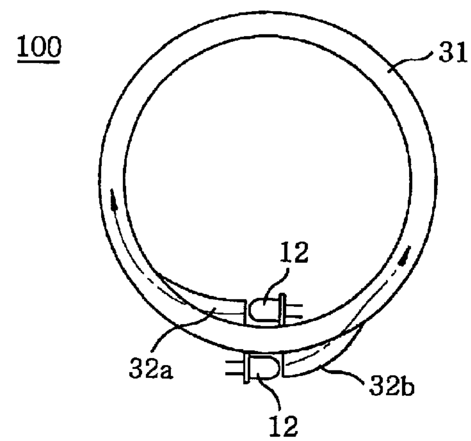
FIGS. 14A and 14B respectively provide top views of a third and a fourth exemplary line type luminous device in accordance with the fourth preferred embodiment.
Figure 14B:
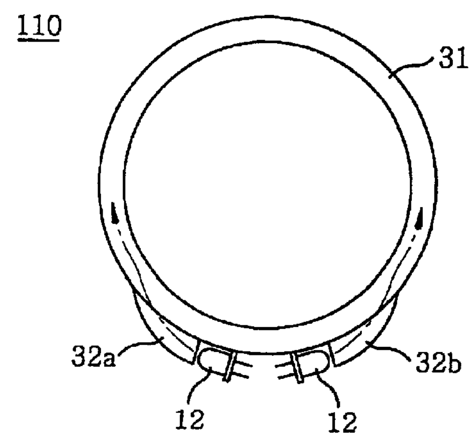
Figure 14C:
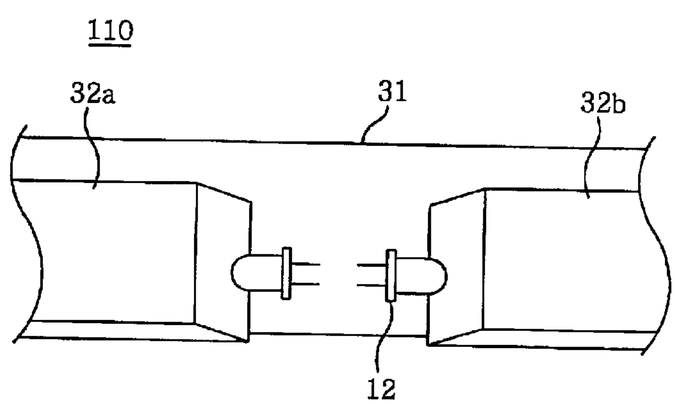
FIG. 14C is a front view of the line type luminous device of FIG. 14B.

FIGS. 14A and 14B respectively show a third and a fourth ring-shaped line type luminous device 100 and 110 in accordance with the fourth preferred embodiment and FIG. 14C is a front view of the fourth ring-shaped line type luminous device 110.

In FIG. 14A, the first and the second light-entering portion 32*a* and 32*b* of the ring-shaped line type luminous device 100 are respectively disposed along an inner and an outer circumference of the ring part 31. In FIG. 14B, both of the first and the second light-entering portion 32*a* and 32*b* of the ring-shaped line type luminous device 110 are disposed along the outer circumference of the ring part 31. These structures provide a more compact size but also produce a complete ring-shaped luminous image. To reduce a relatively dark region between the light-entering portions, the first and the second light-entering portion 32*a* and 32*b* of FIG. 14A may be overlapped together, or an additional light source may be provided between the first and the second light-entering portion 32*a* and 32*b* of FIG. 14B.

Figure 15:
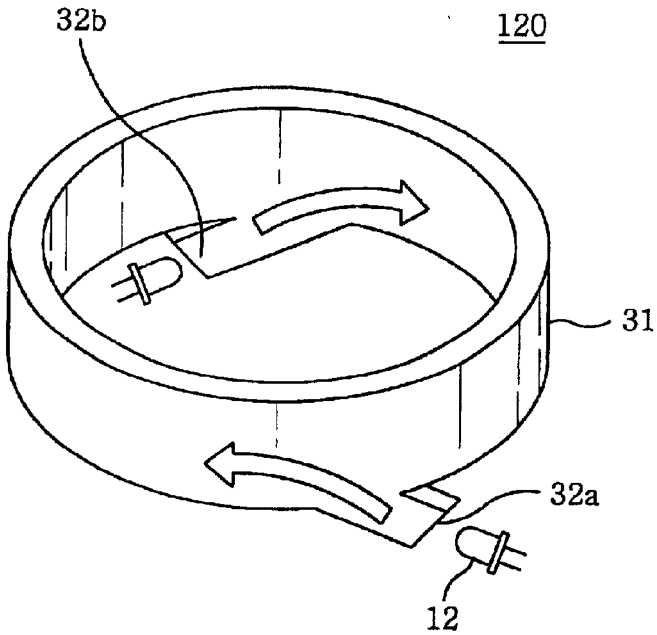
FIG. 15 shows a perspective view of a fifth exemplary line type luminous device in accordance with the fourth preferred embodiment.

FIG. 15 is a perspective view of a fifth ring-shaped line type luminous device 120 in accordance with the fourth preferred embodiment of the present invention. As shown, the first and the second light-entering portion 32*a* and 32*b* are integrally extended from a bottom surface of the ring part 31 and preferably made of a same material as that of the ring part 31. The number of light-entering portions is determined based on whether a uniform luminous image can be formed or not.

Figure 16:
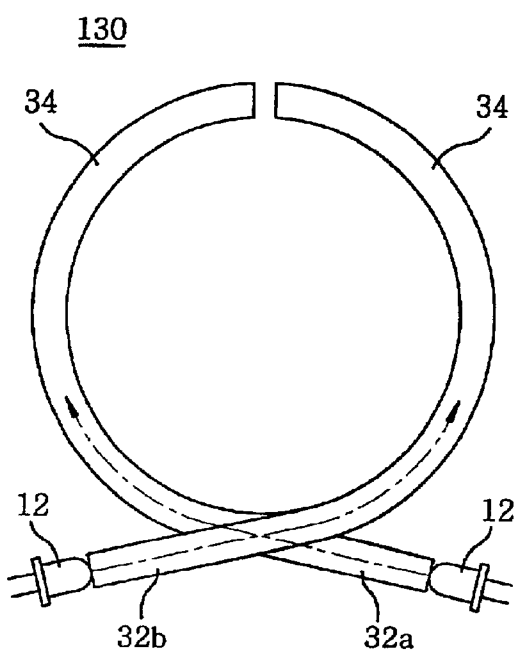
FIG. 16 illustrates a plan view of a sixth exemplary line type luminous device in accordance with the fourth preferred embodiment.

FIG. 16 is a plan view of a sixth ring-shaped line type luminous device 130 in accordance with the fourth preferred embodiment of the present invention. As shown, the ring-shaped line type luminous device 130 includes two semicircular light guides 34 symmetrically opposing each other. First rays and second rays respectively travel in the two semicircular light guides 34 and never meet each other.

Since the first rays and the second rays are optically isolated from each other, the first rays are prevented from entering the second light-entering portion and vice versa, so that loss of light can be reduced. In another view, because a ring-shaped light guide is divided into two semicircular light guides, a handling thereof is relatively easy. For example, the size-reduced semicircular light guide can be fabricated by means of a correspondingly small-sized metallic pattern, or a relatively larger number of semicircular light guides can be produced for each molding process.

In the ring-shaped line type luminous devices in accordance with the fourth preferred embodiment shown in FIGS. 12 to 16, the cross-section of each light-entering portion is of a same shape as that of the light guide or is preferably larger than that of the light guide. In each case, loss of light near the light source can be reduced to thereby achieve a higher efficiency.

Further, the number of light-entering portions or light sources is not limited to two but may be increased based on the length of the light guide for producing a highly uniform luminous image. The total number of light sources may be an even number as shown in FIGS. 12 to 16 or may be an odd number as long as the brightness can be uniform throughout the light guide. Moreover, each configuration of the first to the third preferred embodiment may also be used for the fourth preferred embodiment.

Now, a fifth preferred embodiment of the present invention is explained. Like parts of the previous preferred embodiments are represented by like reference numerals and will not be described in detail.

Figure 17A:
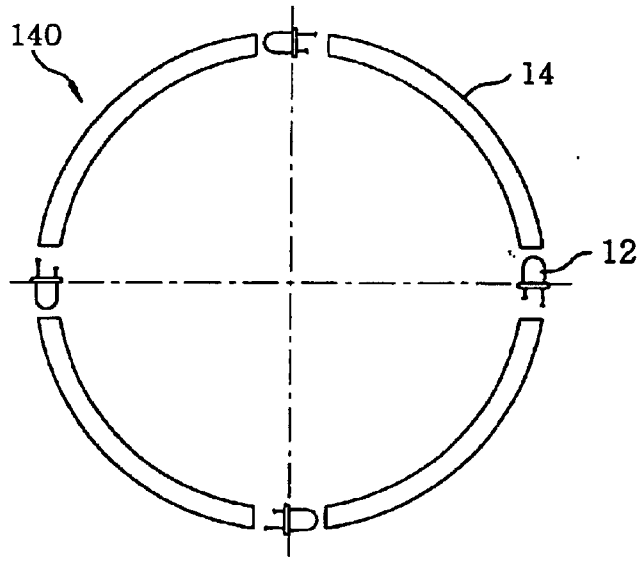
FIG. 17A depicts a plan view of a line type luminous device in accordance with a fifth preferred embodiment of the present invention.

In FIG. 17A, four of the line-shaped luminous units 10 of FIG. 3 are assembled together to form a first ring-shaped line type luminous device 140 in accordance with the fifth preferred embodiment. The first ring-shaped line type luminous device 140 may be disposed along an induction heating coil of an induction heating cooker to indicate a heating region thereof. Herein, the light sources may differ in type, color, size, brightness, or even whether they are turned on or not. By using the first ring-shaped line type luminous device 140, various patterns of luminous images can be provided for the induction heating cooker on the basis of functions, operating states, heating levels, or operation times thereof.

Figure 17B:
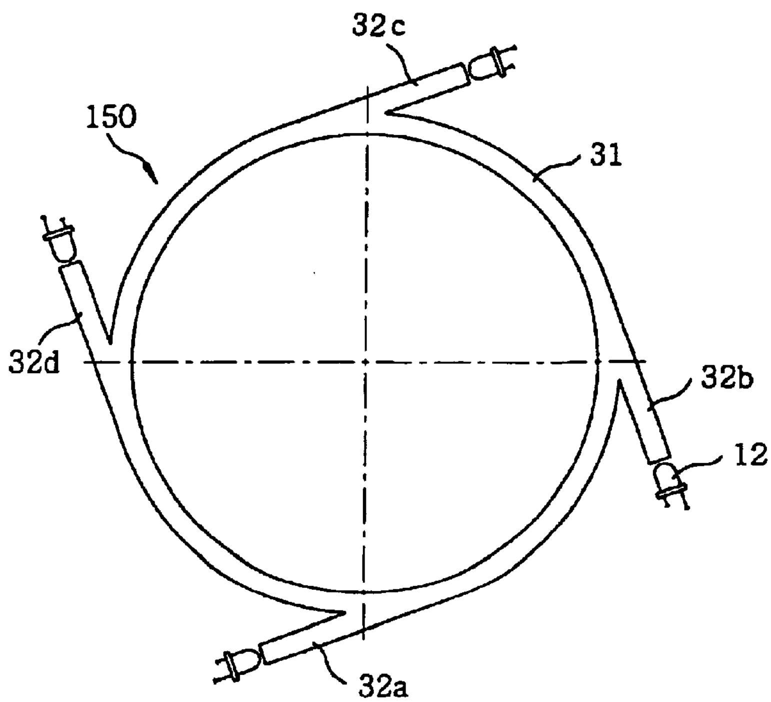
FIG. 17B sets forth a plan view of another line type luminous device in accordance with the fifth preferred embodiment.

In FIG. 17B, a second ring-shaped line type luminous device 150 in accordance with the fifth preferred embodiment includes a ring part 31 and a multiple number of, e.g., four, light-entering portions 32*a* to 32*d* integrally formed along the ring part 31 separated from each other at an equal interval. Compared with the ring-shaped line type luminous device 80 of FIG. 12, because the numbers of light sources and the light-entering portions are increased, a more uniform illuminance can be obtained over the entire ring part 31.

FIGS. 18A to 18D illustrate a sixth preferred embodiment, which is to improve the illuminance of the line type luminous device. Like parts of the previous preferred embodiments are represented by like reference numerals and will not be described in detail.

Figure 18A:
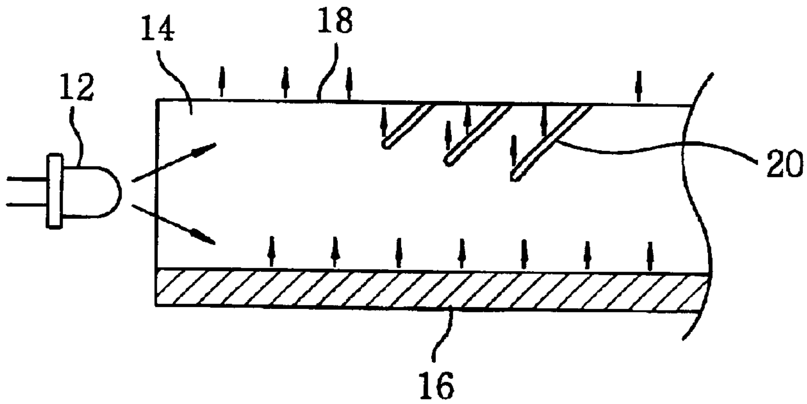
FIGS. 18A to 18D illustrate partial sectional views of various line type luminous devices in accordance with a sixth preferred embodiment of the present invention.

In FIG. 18A, a multiplicity of slits 20 are selectively disposed in a light guide 14. Each slit 20 is slanted with respect to a traveling direction of light radiated from the light source 12 such that rays are directed toward the luminous surface 18 after meeting the slits 20. The term “slit” used herein refers to a plane-like region having two generally parallel major surfaces and filled with a material, e.g., air in the simplest case, having a different index of refraction from that of the light guide 14. The slits 20 can be formed either inside the light guide 14 or at surface regions thereof and may be of a curved shape or, preferably, a planar shape. It is also preferable that the luminous surface 18 and the slit 20 make an acute angle against the light source 12.

Rays of light from the light source 12 enter the light guide 14 and portions thereof are reflected from the reflective layer 16 and the slits 20 toward the luminous surface 18. Since the reflection rate is higher at the slits 20 than at the reflective layer 16 because of the slanted acute angle thereof, the luminous surface 18 has brighter regions onto which the slits 20 are projected. That is to say, the brightness of the light guide 14 can be locally controlled along the longitudinal direction thereof to provide a desired luminous image for an aesthetic purpose and/or for carrying certain information. If the slits 20 are more closely packed and/or sequentially enlarged in proportion to the distance from the light source 12, the brightness can be more uniformly set throughout the overall length of the light guide 14.

Figure 18B:
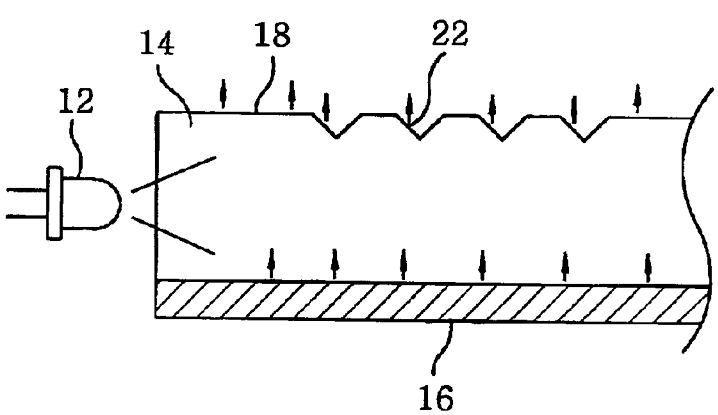

In FIG. 18B, a multiplicity of corrugations 22 or grooves running parallel to each other are disposed on the luminous surface 18. The corrugations 22 also increase the reflection rate such that the luminous surface 18 has brighter regions corresponding thereto. Besides corrugations 22, slits or unevenness formed on the luminous surface 18 may give the same effect. It may be preferable that the running direction of the grooves is substantially normal to the traveling direction of light from the light source 12. Like the slits of FIG. 18A, if the corrugations 22 are more closely packed in proportion to the distance from the light source 12, the brightness can be more uniformly set throughout the overall length of the light guide 14.

Figure 18C:
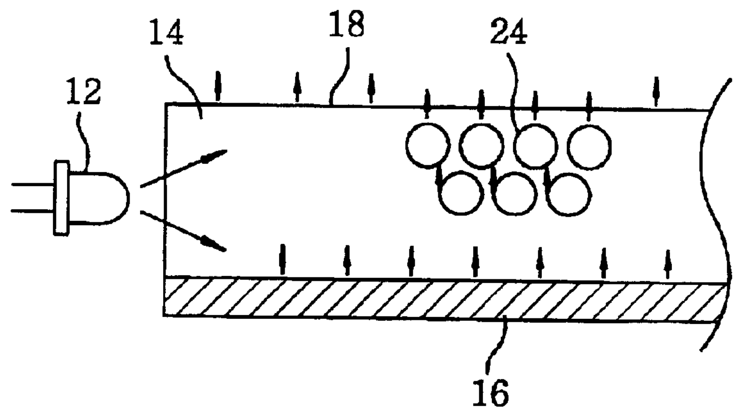

In FIG. 18C, a multiplicity of through holes 24 pass through the light guide 14 from one side surface to the other thereof. Since rays meeting each through hole 24 are reflected toward the luminous surface 18, the through holes 24 also produce the same effects as those of the slits 20 in FIG. 18A or the corrugations 22 in FIG. 18B. The cross-section of the through hole 24 may not be limited to a circle but may be a polygon only to give the same effect. It is also preferable that the through holes 24 are disposed normal to the traveling direction of light from the light source 12, and optionally, the through hole 24 may be substituted with an open hole having a closed end.

Figure 18D:
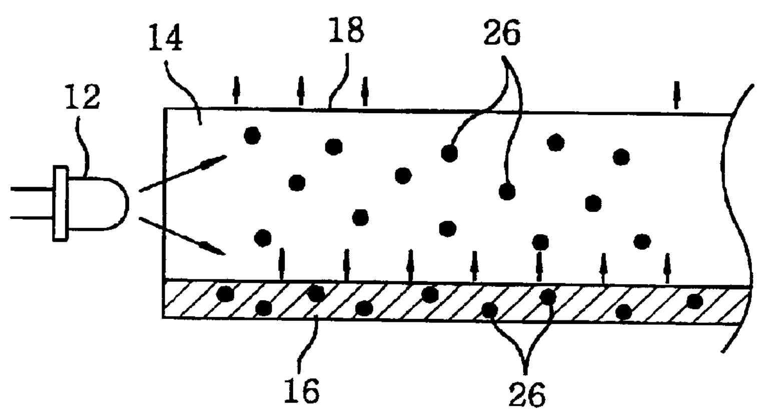

In FIG. 18D, scattering members 26, such as a multiplicity of air bubbles, a powdered metal, or glass beads, are dispersed in the reflective layer 16 and/or the light guide 14. Rays are scattered by the scattering members 26 such that more rays can be emitted out through the luminous surface 18. If the density of the scattering members 26 becomes higher in proportion to the distance from the light source 12, the brightness can be more uniform throughout the overall length of the light guide 14.

In the above-explained sixth preferred embodiment, because the light source 12 has a predetermined luminous intensity, the intensity of radiation in the light guide 14 is constant unless light leaks therethrough or is absorbed thereby. If the brightness is locally adjusted to make it higher at a portion of the light guide 14, it means that more rays pass through the luminous surface 18 at the portion thereof, so that the rays traveling beyond the portion along the light guide 14 are reduced. Therefore, to make the brightness of the line type luminous device uniform, after a standard for the brightness is defined, if needed, another light sources may be added.

Now, a seventh preferred embodiment of the present invention is explained. Like parts of the previous preferred embodiments are represented by like reference numerals and will not be described in detail. In the seventh preferred embodiment and the remaining part of the specification, a light guide is disposed on a projected plane of an induction heating coil and corresponds to an outer circumference thereof. For the sake of simplicity, however, it will be referred to as being arranged along the outer circumference of the induction heating coil in the following explanation.

Figure 19:
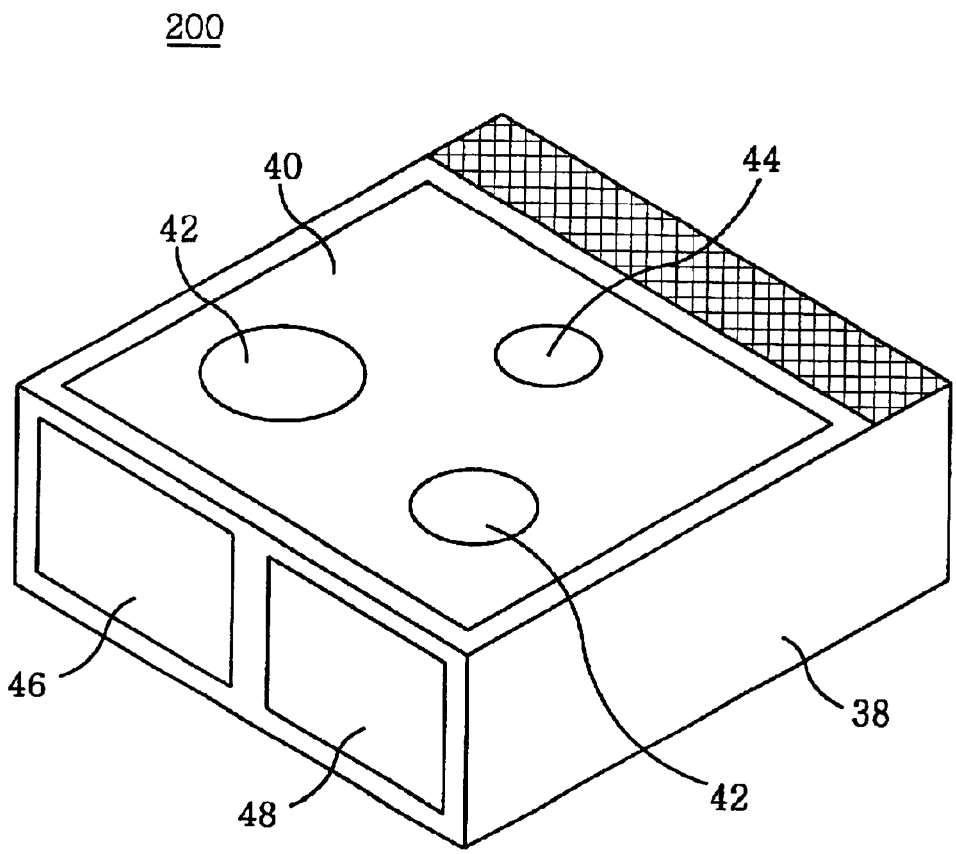
FIG. 19 gives a perspective view of an induction heating cooker in accordance with a seventh preferred embodiment of the present invention.

In FIG. 19, an induction heating cooker 200 in accordance with the seventh preferred embodiment includes a case 38 and a light transmitting, e.g., transparent, translucent or semi-transparent, top plate 40 provided thereon. Disposed on the top plate 40 are heating regions 42 and a radiant heater 44, on which a pot (not shown) is selectively placed. The pot on the heating region 42 is a metallic one that can be heated by applying an induction heating. If the pot is unsuitable for the induction heating, it may be placed on the radiant heater 44 and heated by applying the radiant heating. The induction heating cooker 200 further includes a roasting part 46 and a control panel 48 disposed on a front surface of the case 38.

Figure 20:
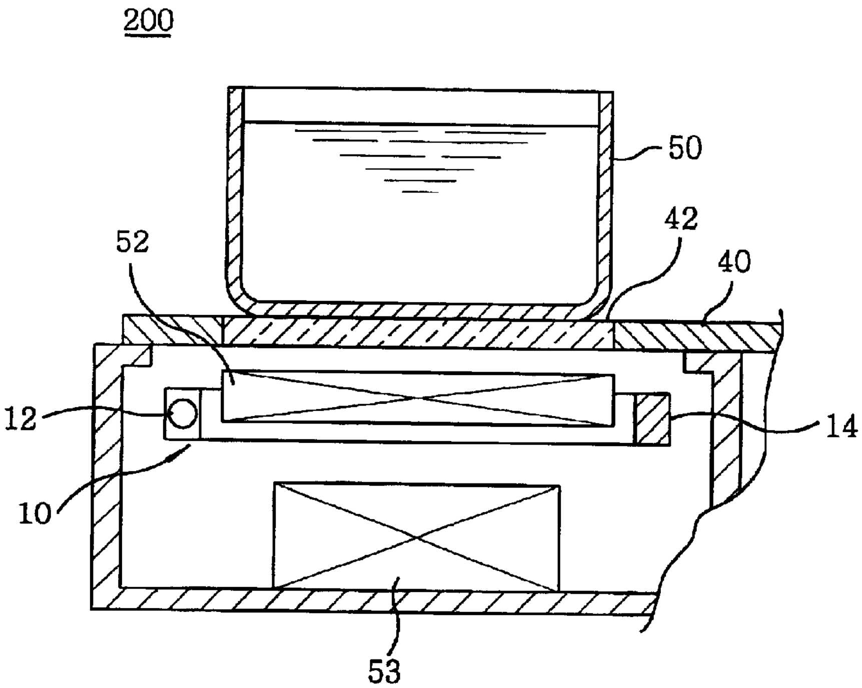
FIG. 20 is a partial sectional view of the induction heating cooker of FIG. 19.

FIG. 20 shows a partial cross-section of the induction heating cooker 200 of FIG. 19. Disposed on the heating region 42 (FIG. 19) of the top plate 40 is a pot 50. For the induction heating, an induction heating coil 52 is disposed under the top plate 40, and more particularly, under the heating region 42, i.e., a mounting location of the pot 50. Disposed along an outer circumference of the induction heating coil 52 is the line type luminous device 10 of FIG. 3 having a light guide 14 and a light source 12.

When the light source 12 provides rays of light for the light guide 14, a luminous image is projected onto the top plate 40 to thereby clearly indicate the range of the heating region 42. Herein, the diameter of the light guide 14 is so large that the outer circumference of the induction heating coil 52 rarely hides the luminous image produced therefrom. Disposed under the induction heating coil 52 is a controller 53 that serves to control the induction heating level or on-off states of the light source 12.

The rays of light produced from the light source 12 continue to propagate along the light guide 14 while being repeatedly reflected. While traveling in the light guide 14, the luminous intensity continuously decreases inside the light guide 14 because portions of the rays are emitted out of the light guide 14. The emitted portions of rays are then projected onto the top plate 40, so that the luminous image having the same shape as the light guide 14 is delineated thereon. If the light guide 14 is of a ring shape as shown in FIG. 6, a ring-shaped line type luminous image is projected onto the top plate 40. Since the flat luminous surface 18 (FIG. 3) of the light guide 14 reduces the divergence of light radiated therefrom, the luminous image can implement a clear ring shape.

Figure 21:
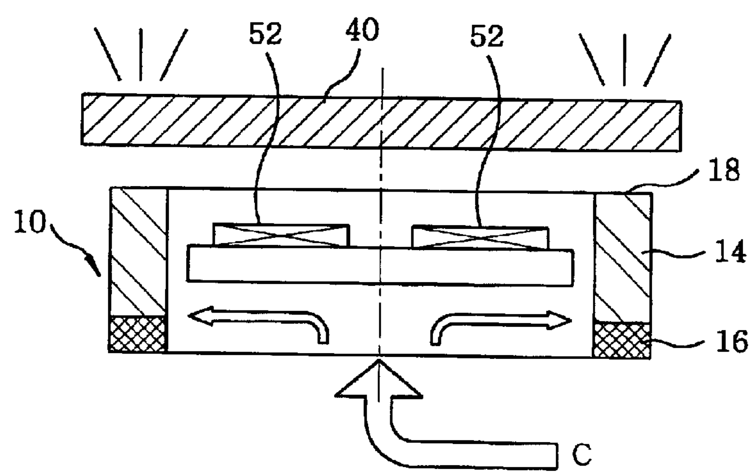
FIG. 21 provides a schematic sectional view of main parts of the induction heating cooker in accordance with the seventh preferred embodiment.
Figure 22:
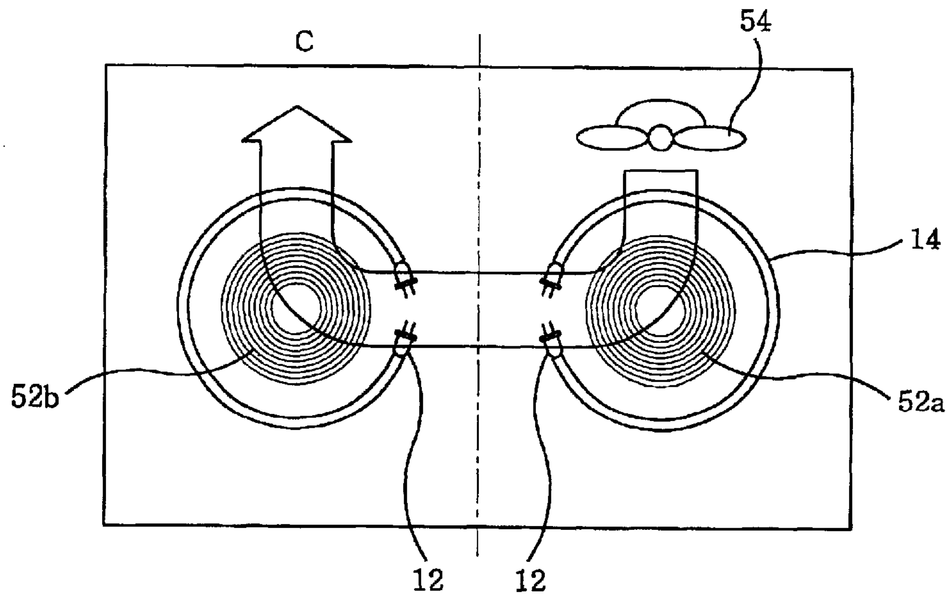
FIG. 22 shows a schematic plan view for describing preferable positions of light sources in the induction heating cooker of the seventh preferred embodiment.

With reference to FIGS. 21 and 22, a positional relationship between cooling air "C" and the line type luminous device 10 is explained.

In FIG. 21, the cooling air "C" serves to cool down the induction heating coil 52 and is preferably flowed into a lower portion thereof for a better cooling efficiency. In FIG. 22, a cooling fan 54 is used to cool down a first induction heating coils 52*a* and a second induction heating coil 52*b*, which are adjacent to each other. The cooling fan 54 produces the cooling air "C" and blows it into a lower portion of the first induction heating coil 52*a*. Subsequently, the cooling air "C" flows into a lower portion of the second induction heating coil 52*b* arranged adjacent to the first induction heating coil 52*a*. After sequentially passing the first and the second induction heating coil 52*a* and 52*b*, the cooling air "C" is exhausted into an exterior.

While cooling the first and the second induction heating coil 52*a* and 52*b*, the cooling air "C" is sequentially heated thereby, so that it may have a relatively high temperature after passing the second induction heating coil 52*b*. Since the light source 12 is a semiconductor device such as an LED, a high temperature may easily deteriorate its properties, e.g., endurance or light-emitting quality.

To prevent the above-mentioned problem, the light source 12 corresponding to the second induction heating coil 52*b* is preferably disposed toward the first induction heating coil 52*a* such that the cooling air "C" meets the light source 12 before meeting the second induction heating coil 52*b*. This arrangement reduces an adverse effect of the cooling air "C" with respect to the light source 12.

Figure 23:
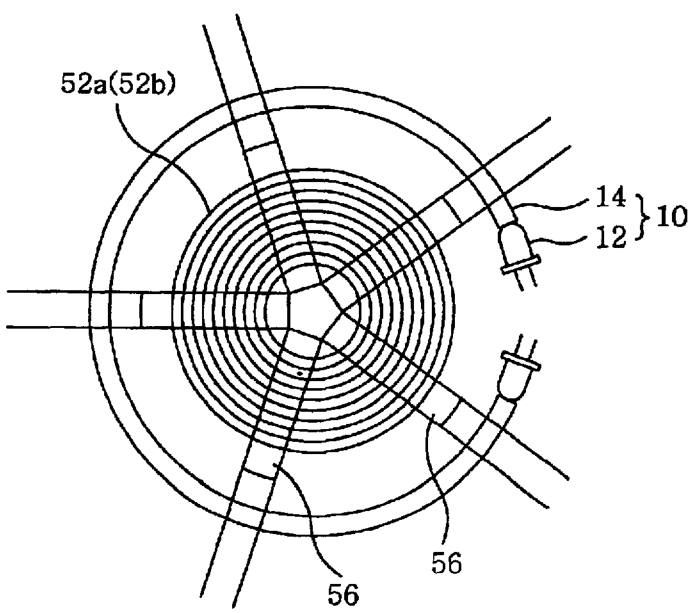
FIG. 23 sets forth a schematic plan view for describing preferable relative positions of a ferrite structure and a line type luminous device of the induction heating cooker in accordance with the seventh preferred embodiment.

FIG. 23 shows a preferred positional relationship between the line type luminous device 10 and a ferrite structure having a multiplicity of ferrite legs 56, which serve to reduce a leakage in magnetic flux produced from the induction heating coil 52*a* or 52*b*. The ferrite legs 56 are radially arranged under each induction heating coil 52*a* and 52*b* such that the magnetic flux is strong along extension lines, each connecting a corresponding ferrite legs 56 and a center of each induction heating coil 52*a* and 52*b*. To avoid the effect from the magnetic flux, herein, each light source 12 is preferably disposed between two adjacent extension lines.

Returning to FIG. 20, the top plate 40 may be made of a crystallized glass, which is preferably stained or painted to hide an interior of the induction heating cooker 200. The stained glass may be formed by mixing the glass with additives or by means of painting. In this preferred embodiment using the line type luminous device 10 to display the luminous image on the top plate 40, a painted glass having a heat-resistant transmitting, e.g., transparent, translucent or semi-transparent, film or paint coated thereon is preferred in that the luminous image looks brighter. The heat-resistant light transmitting film or paint is further advantageous in that the color of the film is determined based on a wavelength of light from the luminous device so that various colors can be displayed. Preferably, the heat-resistant light transmitting film is disposed on an inner surface of the top plate 40 to be protected from an exterior condition.

The line type luminous device in the seventh preferred embodiment is of a ring shape to indicate the overall outer circumference of the induction heating coil. The shape of the line type luminous device, however, is not limited to the ring but may be a semicircle or a rectangle, if needed. Further, the line type luminous device is not limited to indicate the outer circumference of the induction heating coil but may be used to visually differentiate any part of the induction heating cooker from others.

While the invention has been shown and described with respect to the preferred embodiments, it will be understood by those skilled in the art that various changes and modifications may be made without departing from the spirit and scope of the invention as defined in the following claims.

What is claimed is:

1. An induction heating cooker incorporating therein a luminous device, the luminous device comprising:

one or more line-shaped luminous units, each luminous unit including:

an elongated light guide having a generally flat luminous surface for emitting light and another surface disposed opposite to the luminous surface;

one or more light sources for providing light into the light guide; and a reflective layer disposed on said another surface of the light guide, wherein the reflective layer is made of an adhesive and the light guide is joined with another part by the reflective layer, wherein the induction heating cooker comprises:

a light transmitting top plate disposed on a case;

a heating region disposed on the top plate; and an induction heating coil disposed under the to elate corresponding to the position of the heating region, wherein the luminous device is arranged under the top plate along an outer circumference of the induction heating coil and the luminous device emits light toward the top plate along the whole part or portions of the outer circumference.

2. The induction heating cooker of claim 1, wherein the light guide has a rectangular cross-section.

3. The induction heating cooker of claim 1, wherein the light guide is of a ring shape.

4. The induction heating cooker of claim 1, wherein an additional layer is formed on at least one other surface of the light guide than the luminous surface thereof, a refractive index of the additional refractive layer being smaller than that of the light guide.

5. The induction heating cooker of claim 1, wherein a reflectivity of the reflective layer varies along an elongated direction of the light guide.

6. The induction heating cooker of claim 1, wherein at least one of the luminous surface and said another surface of the light guide is substantially a mirror plane.

7. The induction heating cooker of claim 1, wherein at least one of the luminous surface and said another surface of the light guide is of a light scattering plane.

8. The induction heating cooker of claim 1, wherein the luminous surface is substantially parallel to an elongated direction of the light guide.

9. An induction heating cooker incorporating therein a luminous device, the luminous device comprising:

one or more line-shaped luminous units, each luminous unit including:

an elongated light guide having a generally flat luminous surface for emitting light and another surface disposed opposite to the luminous surface, wherein the light guide has a rectangular cross-section, and the luminous surface corresponds to a short side of the rectangular cross-section of the light guide;

one or more light sources for providing light into the light guide; and a reflective layer disposed on said another surface of the light guide, wherein the induction heating cooker comprises:

a light transmitting top plate disposed on a case;

a heating region disposed on the top plate; and an induction heating coil disposed under the top plate corresponding to the position of the heating region, wherein the luminous device is arranged under the top plate along an outer circumference of the induction heating coil and the luminous device emits light toward the top plate along the whole part or portions of the outer circumference.

10. The induction heating cooker of claim 9, wherein a heat-resistant light transmitting film is coated on a bottom surface of the top plate.

11. The induction heating cooker of claim 9, wherein the light guide is of a ring shape.

12. The induction heating cooker of claim 9, wherein the reflective layer is made of an adhesive and the light guide is joined with another part by the reflective layer.

13. The induction heating cooker of claim 9, wherein the luminous surface is substantially parallel to an elongated direction of the light guide.

14. An induction heating cooker comprising:

a luminous device including:

one or more line-shaped luminous units, each luminous unit having:

an elongated light guide with a generally flat luminous surface for emitting light and another surface disposed opposite to the luminous surface;

one or more light sources for providing light into the light guide; and a reflective layer disposed on said another surface of the light guide, a light transmitting top plate disposed on a case;

a heating region disposed on the top plate;

an induction heating coil disposed under the top plate corresponding to the position of the heating region, wherein the luminous device is arranged under the top plate along an outer circumference of the induction heating coil and the luminous device emits light toward the top plate along the whole part or portions of the outer circumference; and a cooling fan for supplying a cooling air, which is introduced into a lower portion of the induction heating coil.

15. The cooker of claim 14, wherein the light guide has a rectangular cross-section.

16. The cooker of claim 15, wherein the luminous surface corresponds to a short side of the rectangular cross-section of the light guide.

17. The cooker of claim 14, wherein the light guide is of a ring shape.

18. The cooker of claim 14, wherein an additional layer is formed on at least one other surface of the light guide than the luminous surface thereof, a refractive index of the additional refractive layer being smaller than that of the light guide.

19. The cooker of claim 14, wherein a reflectivity of the reflective layer vanes along an elongated direction of the light guide.

20. The cooker of claim 14, wherein the reflective layer is formed by coating to provide a thickness equal to or greater than a predetermined thickness.

21. The induction heating cooker of claim 14, wherein the reflective layer is made of an adhesive and the light guide is joined with another part by the reflective layer.

22. The induction heating cooker of claim 14, wherein the luminous surface is substantially parallel to an elongated direction of the light guide.

23. An induction heating cooker comprising:

two luminous devices, each luminous device including:

one or more line-shaped luminous units, each luminous unit having:

an elongated light guide with a generally flat luminous surface for emitting light and another surface disposed opposite to the luminous surface;

one or more light sources for providing light into the light guide; and a reflective layer disposed on said another surface of the light guide, a light transmitting top plate disposed on a case;

two heating regions disposed on the top plate;

two induction heating coils disposed under the top plate corresponding to the position of the heating regions, wherein one of the luminous devices is arranged under the top plate along an outer circumference of one of the induction heating coils, and the other of the luminous devices is arranged under the top plate along an outer circumference of the other of the induction heating coils, and the luminous devices emits light toward the top plate along the whole part or portions of the outer circumference;

a cooling fan for supplying cooling air, which is introduced into a lower portion of one of the induction heating coils, wherein the cooling air sequentially passes through one of the induction heating coil and the remaining induction heating coil in that order before being exhausted and a light source of a luminous device for the remaining induction heating coil is positioned between the two induction heating coils.

24. An induction heating cooker comprising:

a luminous device including:

one or more line-shaped luminous units, each luminous unit having:

an elongated light guide with a generally flat luminous surface for emitting light and another surface disposed opposite to the luminous surface;

one or more light sources for providing light into the light guide; and a reflective layer disposed on said another surface of the light guide, a light transmitting top plate disposed on a case;

a heating region disposed on the top plate;

an induction heating coil disposed under the top plate corresponding to the position of the heating region, wherein the luminous device is arranged under the top plate along an outer circumference of the induction heating coil and the luminous device emits light toward the top plate along the whole part or portions of the outer circumference; and a multiplicity of ferrite legs radially arranged under the induction heating coil, wherein each light sources disposed between two adjacent extension lines of the ferrite legs.

25. An induction heating cooker comprising:

a luminous device including:

one or more line-shaped luminous units, each luminous unit having:

an elongated light guide with a generally flat luminous surface for emitting light and another surface disposed opposite to the luminous surface;

one or more light sources for providing light into the light guide; and a reflective layer disposed on said another surface of the light guide, a light transmitting top plate disposed on a case;

a heating region disposed on the top plate; and an induction heating coil disposed under the top plate corresponding to the position of the heating region, wherein the luminous device is arranged under the top plate along an outer circumference of the induction heating coil and the luminous device emits light toward the top plate along the whole part or portions of the outer circumference, wherein the luminous device includes more than one luminous units concentrically arranged along the outer circumference of the induction heating coil, the luminous surface facing the top plate.

26. The cooker of claim 25, wherein the luminous device further includes an optical isolation layer between any two adjacent luminous units.

* * * * *

UNITED STATES PATENT AND TRADEMARK OFFICE

CERTIFICATE OF CORRECTION

PATENT NO. : 6,969,834 B2 
APPLICATION NO. : 10/179308
DATED : November 29, 2005
INVENTOR(S) : Kaji et al.

It is certified that error appears in the above-identified patent and that said Letters Patent is hereby corrected as shown below:

Column 15, line 64, "an induction heating coil disposed under the to elate" should read --an induction heating coil disposed under the top plate--

Signed and Sealed this

Seventh Day of November, 2006

JON W. DUDAS
*Director of the United States Patent and Trademark Office*